United States Patent

[11] 3,556,297

| [72] | Inventor | Frank A. Harrington |
| --- | --- | --- |
| | | Sweeney, Tex. |
| [21] | Appl. No. | 767,054 |
| [22] | Filed | Oct. 2, 1968 |
| [45] | Patented | Jan. 19, 1971 |
| [73] | Assignee | Phillips Petroleum Company |
| | | a corporation of Delaware |
| | | Continuation of application Ser. No. |
| | | 578,563, Sept. 12, 1966, now abandoned. |

[54] FLUID SEPARATION
5 Claims, 4 Drawing Figs.

[52] U.S. Cl. .................................................. 210/83,
210/540
[51] Int. Cl. ....................................................... B01d 17/02
[50] Field of Search .......................................... 210/65, 66,
68, 73, 83, 84, 519, 520, 523, 525, 540, (Skimmer
Digest); 261/7, 8, 77, 121, 124; 55/85

[56] References Cited
UNITED STATES PATENTS

| 115,605 | 6/1871 | Harly ............................ | 261/124 |
| --- | --- | --- | --- |
| 1,232,370 | 7/1917 | Morison ....................... | 210/525X |
| 3,358,834 | 12/1967 | El-Hindi ....................... | 210/73 |

*Primary Examiner*—John Adee
*Attorney*—Young and Quigg

ABSTRACT: A method for separating a liquid superimposed in stratified relationship to a lower immiscible liquid, for example, oil on water, by injecting an insoluble gas beneath the surface of the liquids to create a zone of lower density and causing this zone to move progressively across the surface and to move the superimposed liquid with it toward a point from which the superimposed liquid is removed.

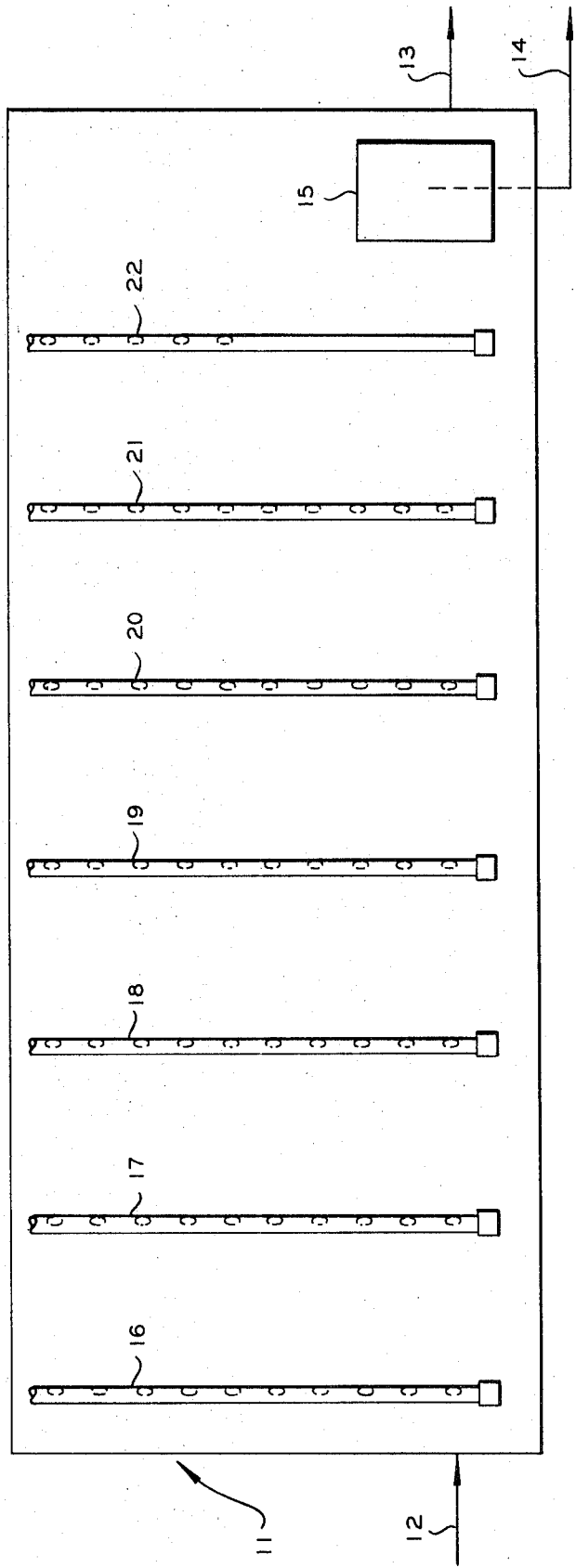
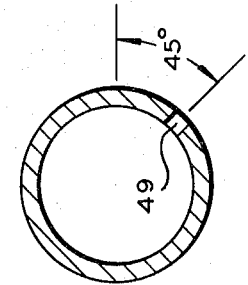
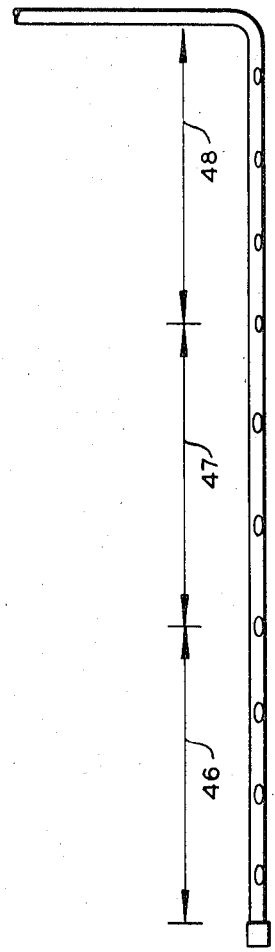
INVENTOR
F.A. HARRINGTON
ATTORNEYS

FLUID SEPARATION

This is a continuation of application Ser. No. 578,563, filed Sept. 12, 1966, now abandoned.

This invention relates to fluid separation. In one aspect it relates to a method of and apparatus for separating immiscible fluids.

Water contaminated with immiscible fluids, such as oil, is encountered in many industrial operations. The oil and solids which contaminate the water must be removed before the water can be used in other operations or disposed of in sewer systems. Oil-contaminated water is accumulated in refining operations from drainage of various equipment, leaks, etc., in petroleum refining. However, the oil-contaminated water problem is not limited to the petroleum industry but occurs in many industries such as coal, the recovery of fish oils, etc.

Waste oil in the petroleum industry is currently skimmed off water in a waste oil separator with a cumbersome, floating skimmer. Such a system has proved ineffective and time consuming, especially where settling out of solid particles occurs in the separator. A surface film of oil is retained by the settled solids and upon the solids being disturbed the surface film of oil is released by those solids disturbed, thus producing another film of oil on the surface of the water previously cleaned by the floating skimmer. Another problem encountered by the floating skimmer in a waste oil separator is the necessity of repeated use of the skimmer to sweep the surface of the water clean of the oil film.

An object of my invention is to separate immiscible fluids.

Another object of my invention is to separate oil from water and settled solid particles in a waste oil separator.

Further aspects, objects and advantages of my invention will be apparent to one skilled in the art upon a study of the written description, the drawing and the appended claims.

According to the invention a lighter liquid is separated from a heavier liquid of two immiscible liquids in a separation zone by introducing a gas into the separation zone and causing the lighter liquid to move across the surface of the heavier liquid toward an outlet.

Further according to the invention oil is separated from the water and settled solid particles by injecting air through a perforated, submerged conduit. Such injection creates a localized area of lowered average density thus producing a rise or crest at the surface. This crest, assisted by the turbulence produced, results in the floating oil being moved away from the air source in the perforated conduit. By feeding the air to a plurality of perforated conduits in succession (sequentially), the oil is followed up and forced to flow toward and into an outlet such as over a skimming weir. Preferably, the perforations in the conduit are pointed downward if settled solids are present to agitate the settled solids, thus causing any oil retained on the surface of the particles to be released thereby and float to the top of the water. The perforations are angled in the direction of flow and are of larger size and/or more closely spaced the further the perforations are from the gas source. Where a weir is employed, the conduit nearest the weir has perforations only in that portion away from the weir in order that proper skimming can be effected.

In the drawing, FIG. 1 is a diagrammatic illustration of an apparatus employed for separating oil from water and settled solids according to my invention.

FIG. 2 is a diagrammatic illustration of a perforated conduit means according to my invention.

FIG. 3 illustrates conduit means positioned within a waste oil separator according to my invention.

FIG. 4 is a cross-sectional view of a perforated conduit used according to my invention.

Figure 1:
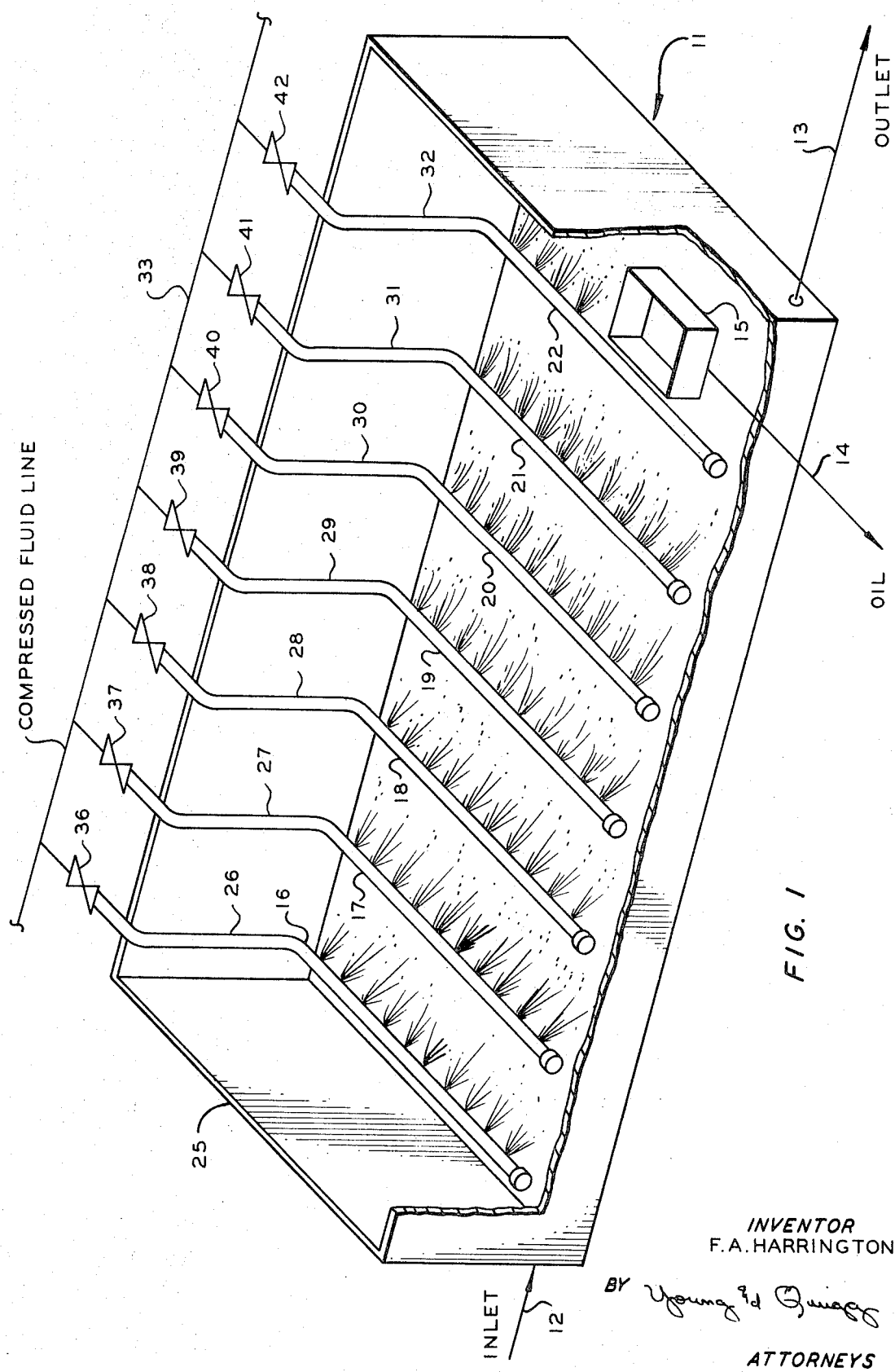

Many controls, switches, valves, etc., not necessary in explaining the invention to one skilled in the art, have been omitted from the drawing for the sake of clarity.

In FIG. 1 the apparatus for separating immiscible fluids from an emulsion containing the same comprises a vessel 11 having an emulsion inlet 12 and outlet 13 for the lower, water phase and outlet means 14 for the upper, oil phase and perforated conduit means disposed within vessel 11. Outlet means 14 comprises an adjustable skimming weir 15 for removing the oil from the upper portion of the water. A plurality of perforated conduits 16, 17, 18, 19, 20, 21 and 22, each having a cap, are positioned within vessel 11 as shown. A plurality of feed conduits 26, 27, 28, 29, 30, 31 and 32 communicate with the perforated conduits and with compressed air line 33. Valves 36, 37, 38, 39, 40, 41 and 42 are placed in the feed conduits to regulate the flow of air through these conduits and thus through perforations in the perforated conduits.

The perforated conduits have perforations angled in a downward direction toward the bottom of vessel 11 and toward the direction of flow of the liquids. The perforations in conduits 16 through 22 are increased in size and more closely spaced as the perforations become further removed from the gas source (not shown). When the fluid level in vessel 11 is raised sufficiently to cover the perforated conduits, air is supplied to a first perforated conduit 16. Air is passed through perforated conduit 16 at an angle downwardly and in the desired direction of flow through vessel 11, to agitate solids in the lower portion of vessel 11, thus causing any surface oil retained by the solids to be released and come to the upper surface of the heavier fluid and to move the oil in the desired direction. With valves 37 through 42 closed and valve 36 open, air is released from perforated conduit 16. This agitates any solid near conduit 16 and creates a crest forcing the oil to move in the desired direction toward skimming weir 15. As the oil passes a second perforated conduit 17, valve 37 is opened and air is passed through said second perforated conduit 17 to similarly agitate solids in the lower portion of vessel 11 and push the oil further downstream. Air is then shut off by valve 36 thus causing the airflow through perforated conduit 16 to cease. The airflow through the remaining perforated conduits 18, 19, 20, 21, and 22 is successively permitted to force the upper, lighter oil film toward the downstream end of vessel 11. Perforated conduit 22 positioned nearest the downstream end of vessel 11 and located nearest weir 15 has perforations only in that portion away from weir 15 in order that proper skimming can be effected. This allows the desired stilling effect near weir 15 for proper removal of the oil.

As shown in FIG. 2 each of perforated conduits 16—21 is evenly divided into three sections. Section 46 comprises 5/64-inch perforations on 6-inch centers, section 47 comprises 5/64-inch perforations on 8-inch centers, and section 48 comprises 1/16-inch perforations on 6-inch centers. The arrangement illustrated by sections 46, 47 and 48 are for the purpose of maintaining an approximately equal flow of air through the various sections of each perforated conduit so as to agitate solids in the bottom of vessel 11 and force the upper surface of the oil film in an even manner across the surface of the water. As noted above conduit 22 has perforations only in that portion located away from weir 15.

In a specific example of the invention as illustrated in FIG. 3 a waste oil separator vessel 11 is 12 feet wide by 31 feet long by about 10 feet deep. The perforated conduits 16 through 22 are spaced 4 feet apart. However, conduit 16 is positioned relatively close to wall 25 on the inlet end of vessel 11 so that all solids within the bottom of the tank in this locus can be agitated thereby. Conduit 22 furthest removed from the upstream end of vessel 11 is positioned at a distance of 6 feet from weir 15, to prevent turbulence at the weir. Perforations are provided in conduit 22 only in the portion of said conduit away from weir 15.

FIG. 4 is a cross-sectional view of perforated conduits 16—22 showing a perforation 49 disposed therein. Perforation 49 is angled in conduits 16—22 in a downstream direction such that the perforation forms a downward angle to assist in agitating the particles in the lower portion of vessel 11. According to the preferred embodiment perforation 49 is positioned at a 45° angle downwardly sloping with respect to the surface of liquid in the vessel.

The perforated conduits in this example are between 1 and 2 feet above the bottom of vessel 11 depending upon the amount of sludge therein. The perforated conduits are made of 3/4-inch pipe. Of course different size pipe, perforations, and spacing can be used, depending upon the size, flow rates, etc., of the system.

Although the invention has been described in detail with respect to the use of a plurality of perforated conduits and sequential air injection, it is possible within the scope of the invention to remove floating oil by moving one such perforated line in the desired direction of movement of the oil. It will be recognized that the invention is not limited to the separation of oil and water but is also applicable to other systems of immiscible liquids, with and without settled solids. Reasonable variation of the angle of the perforation is possible. Where it is not necessary to agitate solids vigorously the perforations can be directed downwardly.

I claim:

1. A method for separating an upper liquid superimposed in immiscible stratified relationship to a lower liquid in a separation zone which comprises creating a crest of low average density on the surface of said zone, causing said crest to travel progressively across said zone, displacing said upper liquid from said crest by causing said upper liquid to flow from said crest in the direction of the travel of said crest, and removing said upper liquid from said zone.

2. The method defined in claim 1 in which said crest of low average density is produced by introducing a gas into said zone.

3. The method defined in claim 1 in which a gas is introduced into said zone to create said crest of low average density, the quantity of said gas being increased as said crest travels progressively across said zone.

4. The method defined in claim 1 in which a gas is introduced downwardly into said zone to cause immiscible liquid to rise from the lower regions of said zone.

5. A method in accordance with claim 1 in which air is introduced to create the crest of low average density, the upper liquid on said crest of low average density being a hydrocarbon, the lower liquid being aqueous.